US011029214B2

(12) United States Patent
Wattellier et al.

(10) Patent No.: US 11,029,214 B2
(45) Date of Patent: Jun. 8, 2021

(54) METHOD AND DEVICE FOR ANALYSING AN ELECTROMAGNETIC WAVE IN HIGH DEFINITION

(71) Applicant: PHASICS, Soisy sur Seine (FR)

(72) Inventors: Benoît Wattellier, Paris (FR); Anaïs Saintoyant, Saint Remy les Chevreuse (FR)

(73) Assignee: PHASICS, Soisy sur Seine (FR)

( * ) Notice: Subject to any disclaimer, the term of this patent is extended or adjusted under 35 U.S.C. 154(b) by 0 days.

(21) Appl. No.: 16/334,906

(22) PCT Filed: Sep. 28, 2017

(86) PCT No.: PCT/EP2017/074674
§ 371 (c)(1),
(2) Date: Mar. 20, 2019

(87) PCT Pub. No.: WO2018/060359
PCT Pub. Date: Apr. 5, 2018

(65) Prior Publication Data
US 2019/0285481 A1 Sep. 19, 2019

(30) Foreign Application Priority Data

Sep. 30, 2016 (FR) ...................................... 1659411

(51) Int. Cl.
*G01J 9/02* (2006.01)
*G02B 5/18* (2006.01)
*G01J 9/00* (2006.01)

(52) U.S. Cl.
CPC .............. *G01J 9/02* (2013.01); *G01J 9/0215* (2013.01); *G02B 5/18* (2013.01); *G01J 2009/002* (2013.01); *G01J 2009/0253* (2013.01)

(58) Field of Classification Search
CPC ...... G02B 5/18; G02B 5/1814; G02B 5/1842; G02B 5/1847; G02B 2005/1804;
(Continued)

(56) References Cited

U.S. PATENT DOCUMENTS 6,304,330 B1 * 10/2001 Millerd .............. G01B 11/2441
356/495
6,538,749 B1 3/2003 Takata et al.
(Continued)

FOREIGN PATENT DOCUMENTS

FR 2795175 A1 12/2000

OTHER PUBLICATIONS

Jean-Christophe F. Chanteloup et al : « Compact high resolution four wave lateral shearing interferometer » dated Sep. 30, 2003.
(Continued)

*Primary Examiner* — Jonathan M Hansen
(74) *Attorney, Agent, or Firm* — Anglehart et al.

(57) ABSTRACT

The present invention relates to a method comprising reception of an incident electromagnetic wave (9) by a diffractive element (2) and conversion of this incident electromagnetic wave (9) into a diffracted electromagnetic wave (10) by the diffractive element (2); reception of the diffracted electromagnetic wave (10) by a matrix-array sensor (4) comprising a matrix-array of pixels that are aligned along one or two axes of pixel alignment (13, 14). The method comprises a plurality of acquisitions, by the matrix-array sensor (4), of a signal of the diffracted electromagnetic wave (10) corresponding to a plurality of relative positions between the diffractive element (2) and the matrix-array sensor (4). The invention also relates to a device (1) implementing this method.

20 Claims, 4 Drawing Sheets

Figure 1:
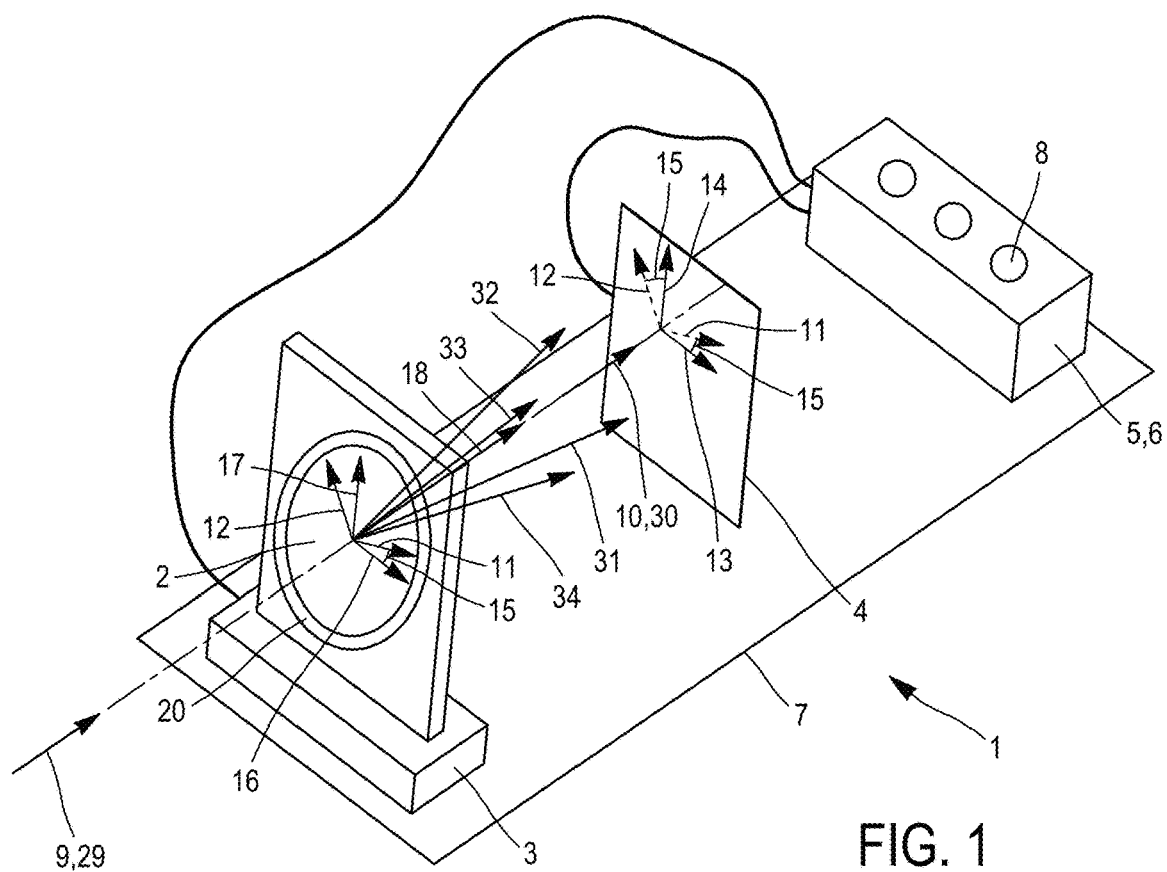

(58) Field of Classification Search
CPC ............... G01J 9/02; G01J 2009/0223; G01J 2009/0234; G01B 2290/30
See application file for complete search history.

(56) References Cited

U.S. PATENT DOCUMENTS

| | | | |
|---|---|---|---|
| 6,577,403 B1 | 6/2003 | Primot et al. | |
| 7,440,188 B2 * | 10/2008 | Fuse ............... | G02B 27/1086 359/566 |
| 2013/0182327 A1 * | 7/2013 | Miyasaka ............ | G01B 11/25 359/572 |

OTHER PUBLICATIONS

Karp J H et al : «Integrated diffractive shearing interferometry for adaptive wavefront sensing » dated Dec. 10, 2008.
PCT application PCTEP2017/074674 IPRP1 dated Apr. 2, 2019.
PCT application PCTEP2017/074674 search report dated Jan. 25, 2018.
PCT application PCTEP2017/074674 search report English translation dated Jan. 25, 2018.
PCT application PCTEP2017/074674 written opinion dated Jan. 25, 2018.
PCT application PCTEP2017/074674 written opinion English translation dated Jan. 25, 2018.
Pierre Bon et al : « Quadriwave lateral shearing interferometry for quantitative phase microscopy of living cells » Optics Express in, 2009.
Yongzhao Du et al : « Spatial carrier phase-shifting algorithm based on principal component analysis method » Optics Express in 2012.

* cited by examiner $$I_z(x,y;dx,dy) = I_0 + \frac{I_0}{2}e^{j(\frac{2\pi}{p}x - \frac{2\pi}{p}z\frac{\partial W}{\partial x})}e^{j\frac{2\pi}{p}dx} + \frac{I_0}{2}e^{-j(\frac{2\pi}{p}x - \frac{2\pi}{p}z\frac{\partial W}{\partial x})}e^{-j\frac{2\pi}{p}dx} + \frac{I_0}{2}e^{j(\frac{2\pi}{p}y - \frac{2\pi}{p}z\frac{\partial W}{\partial y})}e^{j\frac{2\pi}{p}dy} +$$

$$\frac{I_0}{2}e^{-j(\frac{2\pi}{p}y - \frac{2\pi}{p}z\frac{\partial W}{\partial y})}e^{-j\frac{2\pi}{p}dy} + \frac{I_0}{2}e^{j(\frac{2\pi}{p}(x+y) - \frac{2\pi}{p}z\frac{\partial W}{\partial(x+y)})}e^{j\frac{2\pi}{p}(dx+dy)} + \frac{I_0}{2}e^{-j(\frac{2\pi}{p}(x+y) - \frac{2\pi}{p}z\frac{\partial W}{\partial(x+y)})}e^{-j\frac{2\pi}{p}(dx+dy)} +$$

$$\frac{I_0}{2}e^{j(\frac{2\pi}{p}(x-y) - \frac{2\pi}{p}z\frac{\partial W}{\partial(x-y)})}e^{j\frac{2\pi}{p}(dx-dy)} + \frac{I_0}{2}e^{-j(\frac{2\pi}{p}(x-y) - \frac{2\pi}{p}z\frac{\partial W}{\partial(x-y)})}e^{-j\frac{2\pi}{p}(dx-dy)}$$

FIG. 3

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & e^{\frac{2j\pi}{p}dx1} & e^{-\frac{2j\pi}{p}dx1} & e^{\frac{2j\pi}{p}dy1} & e^{-\frac{2j\pi}{p}dy1} & e^{\frac{2j\pi}{p}(dx1+dy1)} & e^{-\frac{2j\pi}{p}(dx1+dy1)} & e^{\frac{2j\pi}{p}(dx1-dy1)} & e^{-\frac{2j\pi}{p}(dx1-dy1)} \\ 1 & e^{\frac{2j\pi}{p}dx2} & e^{-\frac{2j\pi}{p}dx2} & & \cdots & & & & \\ 1 & e^{\frac{2j\pi}{p}dx3} & & \cdots & & & & & \\ \cdots & & & & & & & & \cdots \\ 1 & e^{\frac{2j\pi}{p}dx10} & & & & & & & \\ \cdots & & & & & & & & \end{pmatrix}^{-1} \begin{pmatrix} I(x,y;dx1,dy1) \\ I(x,y;dx2,dy2) \\ I(x,y;dx3,dy3) \\ \cdots \\ I(x,y;dx10,dy10) \\ \cdots \end{pmatrix}$$

FIG. 4

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & e^{\frac{2j\pi}{p}dx1} & e^{-\frac{2j\pi}{p}dx1} & e^{\frac{2j\pi}{p}dy1} & e^{-\frac{2j\pi}{p}dy1} & e^{\frac{2j\pi}{p}(dx1+dy1)} & e^{-\frac{2j\pi}{p}(dx1+dy1)} & e^{\frac{2j\pi}{p}(dx1-dy1)} & e^{-\frac{2j\pi}{p}(dx1-dy1)} \\ 1 & e^{\frac{2j\pi}{p}dx2} & e^{-\frac{2j\pi}{p}dx2} & & \cdots & & & & \\ 1 & e^{\frac{2j\pi}{p}dx3} & & \cdots & & & & & \\ \cdots & & & & & & & & \cdots \\ 1 & e^{\frac{2j\pi}{p}dx9} & & & & & & & \end{pmatrix}^{-1} \begin{pmatrix} I(x,y;dx1,dy1) \\ I(x,y;dx2,dy2) \\ I(x,y;dx3,dy3) \\ \cdots \\ I(x,y;dx9,dy9) \end{pmatrix}$$

FIG. 5

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & \cos(\frac{2\pi}{p}dx_1) & \sin(\frac{2\pi}{p}dx_1) & \cos(\frac{2\pi}{p}dy_1) & \sin(\frac{2\pi}{p}dy_1) & \cos(\frac{2\pi}{p}(dx_1+dy_1)) & \sin(\frac{2\pi}{p}(dx_1+dy_1)) & \cos(\frac{2\pi}{p}(dx_1-dy_1)) & \sin(\frac{2\pi}{p}(dx_1-dy_1)) \\ 1 & \cos(\frac{2\pi}{p}dx_2) & \sin(\frac{2\pi}{p}dx_2) & & & \cdots & & & \\ 1 & \cos(\frac{2\pi}{p}dx_3) & \cdots & & & & & & \\ \cdots & & & & & & & & \cdots \end{pmatrix}^{-1}$$

$$\begin{pmatrix} I(x,y;dx1,dy1) \\ I(x,y;dx2,dy2) \\ I(x,y;dx3,dy3) \\ \cdots \end{pmatrix}$$

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = M^{-1} \begin{pmatrix} I(x,y;dx1,dy1) \\ I(x,y;dx2,dy2) \\ I(x,y;dx3,dy3) \\ \cdots \\ I(x,y;dx10,dy10) \\ \cdots \end{pmatrix}$$

FIG. 6

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & \cos(\frac{2\pi}{p}dx_1) & \sin(\frac{2\pi}{p}dx_1) & \cos(\frac{2\pi}{p}dy_1) & \sin(\frac{2\pi}{p}dy_1) & \cos(\frac{2\pi}{p}(dx_1+dy_1)) & \sin(\frac{2\pi}{p}(dx_1+dy_1)) & \cos(\frac{2\pi}{p}(dx_1-dy_1)) & \sin(\frac{2\pi}{p}(dx_1-dy_1)) \\ 1 & \cos(\frac{2\pi}{p}dx_2) & \sin(\frac{2\pi}{p}dx_2) & & & \cdots & & & \\ 1 & \cos(\frac{2\pi}{p}dx_3) & \cdots & & & & & & \\ \cdots & & & & & & & & \cdots \end{pmatrix}^{-1}$$

$$\begin{pmatrix} I(x,y;dx1,dy1) \\ I(x,y;dx2,dy2) \\ I(x,y;dx3,dy3) \\ \cdots \end{pmatrix}$$

FIG. 7

METHOD AND DEVICE FOR ANALYSING AN ELECTROMAGNETIC WAVE IN HIGH DEFINITION

TECHNICAL FIELD

The present invention relates to a method for analysing (typically measuring the complex field) an electromagnetic wave in high definition. It also relates to a device implementing a method according to the invention.

The invention allows a user to improve the performance in terms of resolution and definition of the wave front analysers. The field of the invention is more particularly that of the phase analysers of an electromagnetic wave or a "wave front".

STATE OF THE PRIOR ART

The resolution of the phase images poses a significant problem.

Wave front analysers are known according to the state of the art, based on the Shack-Hartmann technology. This technology uses a matrix array of microlenses placed in front of a matrix-array sensor. This matrix array of microlenses makes it possible to spatially sample the incident wave front. Each microlens focuses on the sensor each of the different samples of the wave front. Measuring the position of these different spots on the sensor makes it possible to calculate the phase gradients of the incident wave front. However, in order to be able to calculate the barycentre of each spot, it is necessary to distribute the spread thereof over several pixels of the sensor. The latter is thus subdivided, each subdivision corresponding to several pixels, typically 16×16. Each of these subdivisions makes it possible to obtain a single phase measurement point. The spatial resolution of the phase image is thus degraded with respect to the resolution of the sensor.

In order to improve the spatial resolution, wave front analysers are known according to the state of the art, for example the range referenced SID4 marketed by Phasics, comprising a grating facing a sensor, and as used in the article "Quadriwave lateral shearing interferometry for quantitative phase microscopy of living cells" published in the journal Optics Express in 2009 (Vol. 17, No. 15). These analysers make it possible to characterize the incident wave front by the technique known as quadriwave lateral shearing interferometry. Given that the interferogram recorded is quasi-sinusoid, a small number of pixels, preferably 4×4, allows the deformation thereof to be sampled and makes it possible to calculate the phase gradients of the incident wave front and thus improves the resolution of the measurements with respect to the Shack-Hartmann technology. It should be noted that the spatial resolution of the phase images however remains lower than the resolution of the sensor.

Phase analysis methods are also known, such as the one described in the article "*Spatial carrier phase-shifting algorithm based on principal component analysis method*" published in the journal Optics Express in 2012 (Vol. 20, No. 15). According to this method, a single interferogram is recorded, then other interferograms are generated by computer that are spatially offset by a certain number of neighbouring pixels, on the assumption that certain data, in particular phase data, are constant over this number of pixels. This method makes it possible to obtain phase images rapidly. However, the resolution of the phase images obtained is still not that of the sensor used, given that the phase is assumed to be constant over several pixels. The resolution of the phase measurement is thus reduced with respect to that of the sensor. The aim of this method according to the state of the art is not to obtain phase images with a high resolution but to obtain a phase image rapidly with a somewhat degraded resolution.

The aim of the present invention is to propose a method and/or a device for analysing an electromagnetic wave that is quicker and/or more compact and/or has improved definition or resolution with respect to the state of the art.

DISCLOSURE OF THE INVENTION

This aim is achieved with a method for analysing an electromagnetic wave comprising:
  reception of an incident electromagnetic wave by a diffractive element, and conversion of this incident electromagnetic wave into a diffracted electromagnetic wave by the diffractive element, typically by transmission or reflection by the diffractive element,
  reception, by a matrix-array sensor, of an interference pattern of the diffracted electromagnetic wave, the matrix-array sensor having a matrix array of pixels aligned along one or two axis or axes of alignment of pixels,
the method comprising several acquisitions, by the matrix-array sensor, of a signal of the diffracted electromagnetic wave corresponding to several relative positions between the diffractive element and the matrix-array sensor,
the method comprising a calculation, from the several acquisitions corresponding to the several relative positions between the diffractive element and the matrix-array sensor, of a value for intensity and/or phase gradient and/or phase for different points of interest of the incident electromagnetic wave.

Preferably, there is no optical mask and/or other diffractive element between the diffractive element and the sensor. Preferably, there is no optical element between the diffractive element and the sensor.

The diffractive element can generate diffraction orders of the incident electromagnetic wave up to the sensor, preferably:
  at least two diffraction orders of the incident electromagnetic wave up to the sensor, in particular in the case having one dimension (for example in the case where the diffractive element is a periodic pattern having a spatial periodicity along an axis of periodicity).
  at least three diffraction orders (preferably at least four orders) of the incident electromagnetic wave up to the sensor, in particular in the case having two dimensions (for example in the case where the diffractive element is a periodic pattern having a spatial periodicity along two axes of periodicity or more).

The interference pattern received by the matrix-array sensor, and taken into account in calculating a value for intensity and/or phase gradient and/or phase, can comprise at least nine harmonics, or even at least thirteen harmonics, typically:
  nine harmonics, for example in the case of four diffraction orders of a perfect sinusoidal grating on a regular Cartesian grid,
  thirteen harmonics, for example in the case of five diffraction orders corresponding to the four orders mentioned above with an order 0 along the optical (or specular) axis.

The number of the several relative positions can be equal to the number of harmonics of the interference pattern received by the matrix-array sensor and taken into account by the processing means in calculating a value for intensity and/or phase gradient and/or phase.

The method according to the invention can comprise generating diffraction orders of the incident electromagnetic wave by the diffractive element alone. The diffractive element is preferably a periodic pattern having a spatial periodicity along at least one or two axes of periodicity (and/or preferably diffraction properties in at least one or two pair(s) of spatial diffraction directions respectively).

Preferably, there is an angle of inclination between:
the axis or axes of periodicity of the periodic pattern, and
the projection, on the plane of the periodic pattern, of the axis or axes of alignment of pixels of the sensor and/or of the axis or axes of displacement of the relative positions between the diffractive element and the matrix-array sensor.

An angle between the axes of periodicity of the periodic pattern and the axes of alignment of pixels can have a value different from another angle between the axes of alignment of pixels and the axes of displacements.

The method according to the invention can comprise calculating an optimum value of the angle of inclination. Calculating an optimum value of the angle of inclination can comprise maximization of the determinant or of the condition number of a matrix corresponding to a system of equations preferably comprising as many equations as the number of the several relative positions between the diffractive element and the matrix-array sensor.

The method according to the invention can also comprise an adjustment of this angle, preferably to the optimum value thereof.

The several positions preferably correspond to several relative positions between the diffractive element and the matrix-array sensor for a fixed position of the incident electromagnetic wave. The several positions preferably correspond to several positions of the diffractive element for a fixed position of the incident electromagnetic wave and for a fixed position of the matrix-array sensor.

The several positions preferably correspond to several relative positions between the diffractive element and the matrix-array sensor along an axis of displacement or two axes of displacement or more, preferably orthogonal to one another.

Each axis of displacement or at least one of the axes of displacement can be orthogonal to a direction of propagation of the incident electromagnetic wave on the diffractive element.

Each relative position between the diffractive element and the matrix-array sensor can differ from at least one of the other relative positions:
according to a first pitch along a first axis of displacement, this first pitch preferably being constant for all the relative positions, and/or
according to a second pitch along a second axis of displacement, this second pitch preferably being constant for all the relative positions.

The method according to the invention can comprise a calculation of an optimum value of the first pitch and/or of an optimum value of the second pitch (including when the pitch(es) are not constant). Calculating an optimum value of the first pitch and/or an optimum value of the second pitch can comprise a maximization of the determinant or of the condition number of a matrix corresponding to a system of equations preferably comprising as many equations as the number of the several relative positions between the diffractive element and the matrix-array sensor.

The several positions can correspond to at least three different positions. The several positions can correspond to at least nine different positions, or even at least thirteen different positions.

The diffractive element preferably has a spatial periodicity along at least two axes of periodicity.

In a variant, the diffractive element can be a diffractive element that is mobile with respect to the matrix-array sensor. The diffractive element can comprise a Hartmann mask, a Shack-Hartmann mask, a diffraction grating, and/or a combination of an intensity grating and a phase grating.

In another variant, the diffractive element can be borne or displayed by an optical component that is fixed with respect to the matrix-array sensor, said optical component being arranged in order to displace the diffractive element (or the display of this diffractive element) with respect to the matrix-array sensor, said optical component preferably being a spatial light modulator, for example having liquid crystals.

Calculating a value for intensity and/or phase gradient and/or phase can comprise resolving a system of equations preferably comprising as many equations as the number of the several relative positions between the diffractive element and the matrix-array sensor. The system of equations can be resolved by use of a pseudo inverse matrix (preferably in real space or direct).

All or part (preferably all except one) of the unknowns of the equation system are preferably expressed as a function of a phase gradient of the incident electromagnetic wave.

According to yet another aspect of the invention, a device is proposed for analysing an electromagnetic wave, comprising:
a diffractive element arranged in order to receive an incident electromagnetic wave and in order to convert this incident electromagnetic wave into a diffracted electromagnetic wave, typically by transmission or reflection by the diffractive element,
a matrix-array sensor having a matrix array of pixels aligned along one or two axis or axes of alignment of pixels, said sensor being arranged in order to receive an interference pattern of the diffracted electromagnetic wave originating from the diffractive element,
the device comprising displacement means arranged in order to modify the relative position between the diffractive element and the matrix-array sensor, said device being arranged in order to carry out several acquisitions, by the matrix-array sensor, of a signal of the diffracted electromagnetic wave corresponding to several relative positions between the diffractive element and the matrix-array sensor,
the device comprising processing means, arranged and/or programmed in order to calculate, from the several acquisitions corresponding to the several relative positions between the diffractive element and the matrix-array sensor, a value for intensity and/or phase gradient and/or phase for different points of interest of the incident electromagnetic wave.

Preferably, there is no optical mask and/or other diffractive element between the diffractive element and the sensor. Preferably, there is no optical element between the diffractive element and the sensor.

The diffractive element can be arranged in order to generate diffraction orders of the incident electromagnetic wave up to the sensor, preferably:
at least two diffraction orders of the incident electromagnetic wave up to the sensor, in particular in the case having one dimension (for example in the case where the diffractive element is a periodic pattern having a spatial periodicity along an axis of periodicity), at least three diffraction orders (preferably at least four orders) of the incident electromagnetic wave up to the sensor, in particular in the case having two dimensions (for example in the case where the diffractive element is a periodic pattern having a spatial periodicity along two axes of periodicity or more).

The processing means can be arranged and/or programmed in order to take into account, for calculating the value for intensity and/or phase gradient and/or phase, at least nine harmonics, or even at least thirteen harmonics of the interference pattern received by the matrix-array sensor, typically:

nine harmonics, for example in the case of four diffraction orders of a perfect sinusoidal grating on a regular Cartesian grid, thirteen harmonics, for example in the case of five diffraction orders corresponding to the four orders mentioned above with an order 0 along the optical (or specular) axis.

The processing means can be arranged and/or programmed in order to control the displacement means for a number of the several relative positions equal to the number of harmonics of the interference pattern taken into account by the processing means in calculating a value for intensity and/or phase gradient and/or phase.

The diffractive element can be arranged in order to generate by itself diffraction orders of the incident electromagnetic wave.

The diffractive element is preferably a periodic pattern having a spatial periodicity along at least one or two axes of periodicity (and/or preferably diffraction properties along respectively at least one or two pair(s) of spatial diffraction directions).

Preferably, there is an angle of inclination between:

the axis or axes of periodicity of the periodic pattern, and the projection, on the plane of the periodic pattern of the axis or axes of alignment of pixels of the sensor and/or of the axis or axes of displacement of the relative positions between the diffractive element and the matrix-array sensor.

The processing means are preferably arranged and/or programmed in order to calculate an optimum value of the angle of inclination. These processing means can be arranged and/or programmed in order to calculate the optimum value of the angle of inclination by a maximization of the determinant or of the condition number of a matrix corresponding to a system of equations preferably comprising as many equations as the number of the several relative positions between the diffractive element and the matrix-array sensor.

The device according to the invention can also comprise means for adjusting this angle, preferably to the optimum value thereof.

The several positions can correspond to several relative positions between the diffractive element and the matrix-array sensor for a fixed position of the incident electromagnetic wave. The several positions can correspond to several positions of the diffractive element for a fixed position of the incident electromagnetic wave and for a fixed position of the matrix-array sensor, the displacement means being arranged in order to displace the diffractive element for a fixed position of the incident electromagnetic wave and for a fixed position of the matrix-array sensor.

The several positions can correspond to several relative positions between the diffractive element and the matrix-array sensor along an axis of displacement or two axes of displacement or more, preferably orthogonal to one another.

Each axis of displacement or at least one of the axes of displacement can be orthogonal to a direction of propagation in which the diffractive element is arranged in order to receive the incident electromagnetic wave.

The displacement means can be arranged so that each relative position between the diffractive element and the matrix-array sensor differs from at least one of the other relative positions:

according to a first pitch along a first axis of displacement, this first pitch preferably being constant for all the relative positions, and/or according to a second pitch along a second axis of displacement, this second pitch preferably being constant for all the relative positions.

The processing means are preferably arranged and/or programmed in order to calculate an optimum value of the first pitch and/or an optimum value of the second pitch (including when the pitch(es) are not constant). These processing means can be arranged and/or programmed in order to calculate an optimum value of the first pitch and/or an optimum value of the second pitch by maximization of the determinant or of the condition number of a matrix corresponding to a system of equations preferably comprising as many equations as the number of the several relative positions between the diffractive element and the matrix-array sensor.

The several positions can correspond to at least three different positions.

The several positions can correspond to at least nine different positions, or even at least thirteen different positions.

The diffractive element preferably has a spatial periodicity along at least two axes of periodicity.

In a variant, the diffractive element can be a diffractive element that is mobile with respect to the matrix-array sensor. The diffractive element can comprise a Hartmann mask, a Shack-Hartmann mask, a diffraction grating, and/or a combination of an intensity grating and a phase grating.

In another variant, the diffractive element can be borne or displayed by an optical component that is fixed with respect to the matrix-array sensor, said optical component being arranged in order to displace the diffractive element (or the display of this diffractive element) with respect to the matrix-array sensor, said optical component preferably being a spatial light modulator, for example having liquid crystals.

The processing means can be arranged and/or programmed in order to calculate a value for intensity and/or phase gradient and/or phase by resolving a system of equations preferably comprising as many equations as the number of the several relative positions between the diffractive element and the matrix-array sensor. The processing means can be arranged and/or programmed in order to resolve the system of equations by use of a pseudo inverse matrix (preferably in real space).

All or part (preferably all except one) of the unknowns of the equation system are preferably expressed as a function of a phase gradient of the incident electromagnetic wave.

DESCRIPTION OF THE FIGURES AND EMBODIMENTS

Figure 2:
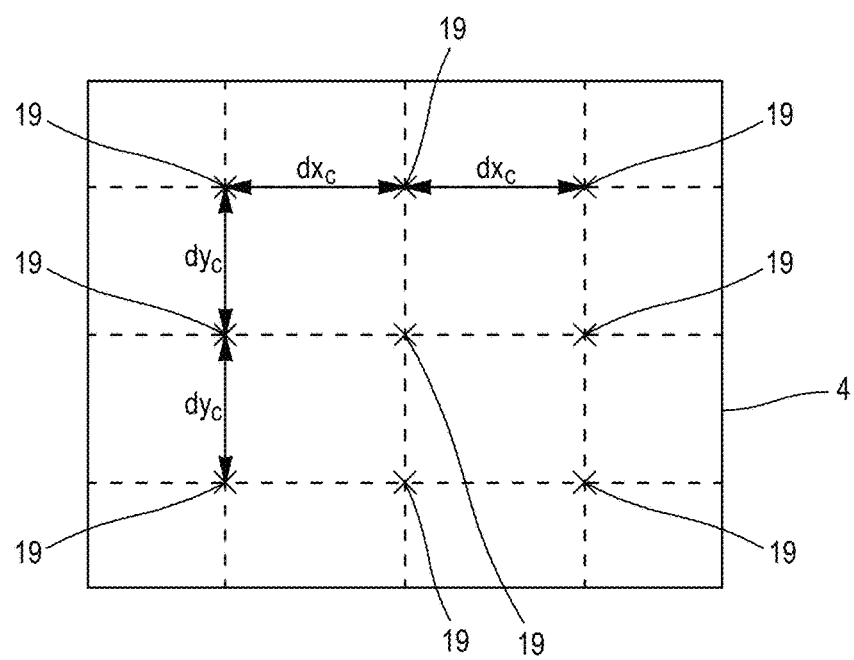
Figure 8:
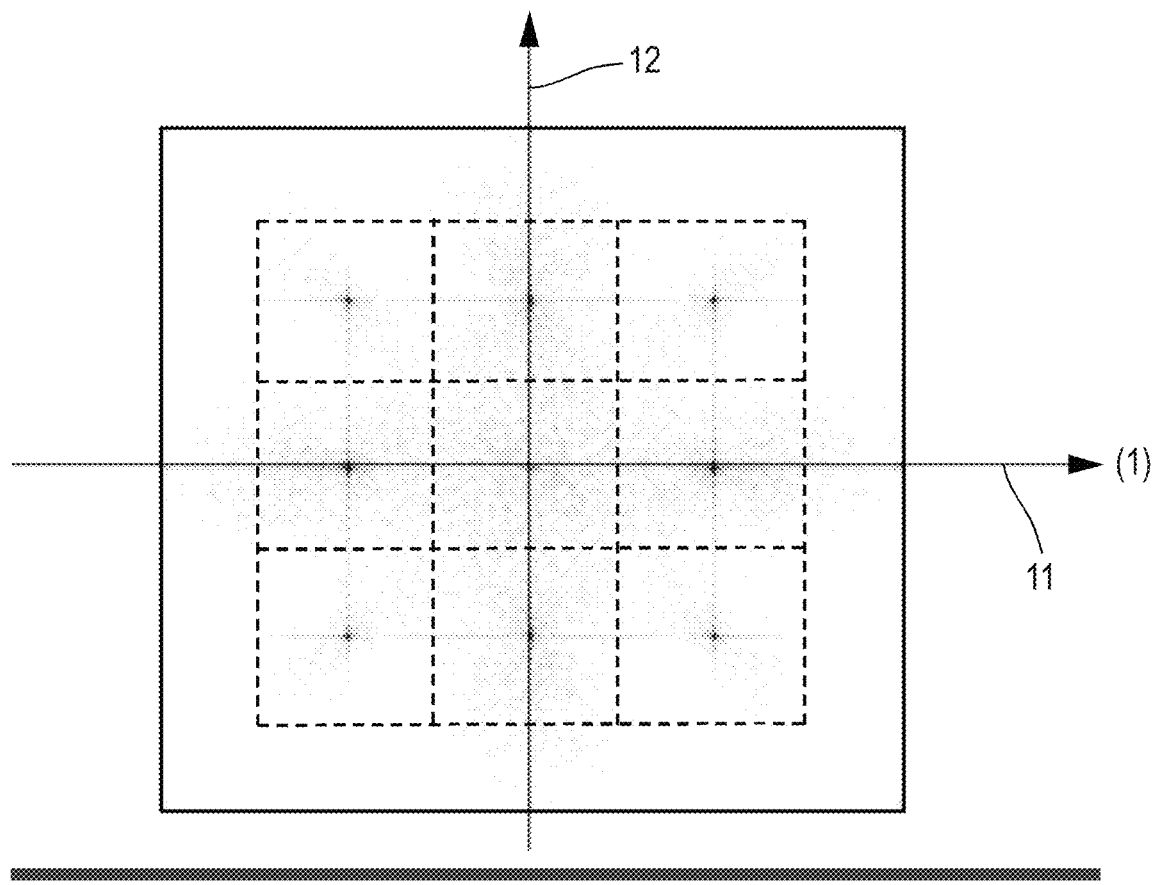

Other advantages and characteristics of the invention will become apparent on reading the detailed description of implementations and embodiments which are in no way limitative, and from the following attached drawings:

FIG. 1 is a diagrammatic view of a preferred embodiment of the device according to the invention, implementing a preferred embodiment of the method according to the invention, comprising a periodic pattern 2 and a sensor 4, FIG. 2 shows nine positions of a point 19 of the periodic pattern 2 with respect to the sensor 4, corresponding to P=9 different relative positions between the periodic pattern 2 and the matrix-array sensor 4, for a particular embodiment having pitches $dx_C$ and $dy_C$ that are constant and equal, and FIGS. 3 to 7 are equations explaining this embodiment according to the invention FIG. 8 illustrates the Fourier transform of an interference pattern (or interferogram) of the diffracted wave 10.

As these embodiments are in no way limitative, variants of the invention may be considered in particular comprising only a selection of the characteristics described or illustrated hereinafter, in isolation from the other characteristics described or illustrated (even if this selection is isolated within a phrase containing these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1 to 7, a description will be given of a preferred embodiment of the analysis device 1 according to the invention implementing a preferred embodiment of the method according to the invention.

The device 1 comprises a diffractive element 2. In this embodiment, the diffractive element 2 is a mobile diffractive element 2, as it is mounted on displacement means 3.

In this embodiment the diffractive element 2 is a periodic pattern having a spatial periodicity along at least one or two axes of periodicity (and/or preferably diffraction properties along respectively at least one or two pair(s) of spatial diffraction directions).

This periodic pattern 2 can be a periodic pattern of transmission (as shown) or of reflection of the incident wave 9.

The device 1 comprises a sensor 4, preferably a CCD, CMOS, sCMOS or microbolometric image sensor, for example the Bobcat IGV-B2020 camera.

The displacement means 3 are arranged in order to modify the relative position between the diffractive element 2 and the matrix-array sensor 4.

The displacement means 3 are arranged in order to modify this relative position or in order to displace the diffractive element 2 along at least two axes of displacement 16, 17 situated in the plane of the diffractive element 2 and preferably orthogonal to one another (and also optionally, for adjustments, along a third axis of displacement 18 orthogonal to the axes 16, 17).

The displacement means 3 comprise a motorized stage (piezoelectric or electromagnetic stage) and have a typical displacement precision of 2/1000 of the pitch p of the periodic pattern 2, typically of 40 nm. The stage 3 is for example a Newport NPXY200SG reference stage.

The displacement means 3 are connected to control means 5, preferably electronic and/or computerized.

The means 5 comprise for example an analogue and/or digital electronic circuit, and/or a central processor unit of a computer, and/or a microprocessor, and/or software means.

The sensor 4 comprises a two-dimensional matrix array of pixels aligned along two axes 13, 14 of alignment of pixels.

The pixels are typically square in shape and are aligned along the two axes 13, 14 with a period for example equal to 7.4 µm. In a variant, the period can vary between the two axes 13 and 14.

In this embodiment, the two axes 13, 14 of alignment of pixels are orthogonal to one another.

The sensor 4 is connected to means 6 (preferably electronic and/or computerized) for receiving and processing the signals acquired by the sensor 4.

The means 6 comprise for example an analogue and/or digital electronic circuit, and/or a central processor unit of a computer, and/or a microprocessor, and/or software means.

The means 6 are arranged and/or programmed in order to implement each of the calculation steps described hereinafter for the embodiment of the method according to the invention.

The diffractive element 2, the displacement means 3, the sensor 4, the control means 5, and the processing means 6 are placed inside a case, shown diagrammatically as reference 7 in FIG. 1.

The device 1 comprises one or more connectors 8 (for example of the USB, micro USB, RS232, BNC type etc.).

Each connector 8 can be accessed from outside the case 7, in particular in order to send the results of processing, by the means 6, of the signals acquired by the sensor 4, out of the device 1 and/or in order to send instructions, from outside the device 1, to the control means 5 and/or to the processing means 6.

The diffractive element 2 is arranged in order to receive an incident electromagnetic wave 9 propagating in a direction of propagation 29.

The diffractive element 2 is arranged in order to generate replicas of the incident beam 9 so that these replicas interfere with one another by propagation.

The displacement means 3 are arranged in order to displace the diffractive element 2 for a fixed position of the incident electromagnetic wave 9 and for a fixed position of the matrix-array sensor 4.

The periodic pattern 2 is planar.

The periodic pattern 2 has a spatial periodicity along at least one or two axes of periodicity 11, 12 (the spatial periodicity being capable of varying from one axis of periodicity 11 to another 12).

The periodic pattern 2 has diffraction properties along respectively at least one or two pair(s) of spatial diffraction directions (32, 34) and/or (31, 33).

The diffractive element 2 is thus arranged in order to convert this incident electromagnetic wave 9 into a diffracted electromagnetic wave 10.

The diffractive element 2 and the sensor 4 are spaced apart by a non-zero distance (along the mean axis of propagation of the diffracted wave).

The diffracted wave 10 comprises (and preferably consists of) different diffraction orders generated by the diffraction of the incident wave 9 by the periodic pattern 2.

These diffraction orders will interfere two-by-two and generate systems of interference fringes. Within the Fourier space, each of these systems of fringes generates information around a specific frequency, called a "harmonic" in the present description.

Thus, the diffraction orders generated interfere at the level of the matrix-array sensor 4. An interference pattern is obtained, also comprising axes of periodicity. The Fourier transform of the signal obtained by the sensor 4 comprises different harmonics corresponding to the interferences between each pair of diffraction orders. Depending on the model used in order to describe the formation of this signal, the number of harmonics considered useful varies.

The direction of propagation 29 is perpendicular to the plane of the diffractive element 2 (plane in which the conversion of the incident wave 9 into diffracted wave 10 is carried out, and parallel to the axes 11, 12 and/or 16, 17) and/or to the plane of the sensor 4 (plane comprising the pixels of the sensor 4, and parallel to the axes 13, 14).

The third axis of displacement 18 is perpendicular to the plane of the diffractive element 2 and/or to the plane of the sensor 4.

In this embodiment, the axes 11, 12 are orthogonal to one another.

For greater simplicity, at least one of the two axes of displacement 16, 17 projected in the plane of the sensor 4, and more precisely in the present embodiment each of the two axes of displacement 16, 17, is parallel to one of the axes of alignment 13, 14.

The diffractive element 2 is arranged in order to generate or select (i.e. allow to pass as far as the sensor 4) by itself only certain diffraction orders of the incident electromagnetic wave 9. The diffractive element 2 is arranged in order to carry out this generation or selection without combining with another mask or grating or element having diffraction properties that is not fixed to the diffractive element 2.

The present embodiment is "two-dimensional".

The diffractive element 2 is arranged in order to generate at least three diffraction orders of the incident electromagnetic wave 9 up to the sensor 4.

More specifically in the present embodiment, the diffractive element 2 is arranged in order to generate at least (or exactly) four diffraction orders of the incident electromagnetic wave 9 up to the sensor 4, and the processing means are arranged and/or programmed in order to take into account, for calculating the value for the intensity and/or phase gradient and/or phase, at least (or exactly) nine harmonics of the interference pattern that are received by the matrix-array sensor; or the diffractive element 2 is arranged in order to generate at least (or exactly) five diffraction orders of the incident electromagnetic wave 9 up to the sensor 4, and the processing means are arranged and/or programmed in order to take into account, for calculating the value for the intensity and/or phase gradient and/or phase, at least (or exactly) thirteen harmonics of the interference pattern that are received by the matrix-array sensor.

The diffractive element 2 typically comprises any type of periodic lens system.

The diffractive element 2 comprises for example a Hartmann mask or a modified Hartmann mask (or "MHM") as described for the reference GR in patent application FR2795175 A1 (typically a grating made from silica with a pitch of 29.6 μm) or a Shack-Hartmann mask or a diffraction grating, or a combination of an intensity grating and a phase grating.

Values corresponding to the use of an MHM will be given hereinafter.

There is an angle of inclination 15 (greater than 0° and less than 90°, typically equal to 30°±3°), in a projection on the plane of the periodic pattern 2, between:
- the axis or axes of periodicity 11 and/or 12 and
- the axis or axes of alignment respectively 13 and/or 14 of pixels, and/or the axis or axes of displacement 16, 17.

Preferably, no projection of an axis of alignment of pixels 13, 14 in the plane of the periodic pattern 2 is parallel to the, or to one of, the axis or axes 11, 12.

The element 2 is mounted on the adjustment means 20 or rotary support 20 arranged in order to allow an adjustment of the angular position 15 of the element 2 with respect to the sensor 4.

The sensor 4 is arranged in order to receive an interference pattern of the diffracted electromagnetic wave 10.

The device 1 is arranged in order to carry out several acquisitions, by the matrix-array sensor 4, of a diffracted electromagnetic wave signal 10 corresponding to several relative positions (preferably at least three different positions, preferably at least nine different positions) between the diffractive element 2 and the matrix-array sensor 4. Each of these signals is thus an electronic signal (analogue and/or digital) generated by the sensor 4 in response to the reception of the diffracted electromagnetic wave 10 and comprising data for each of the pixels of the sensor 4.

These several relative positions correspond to several positions of the diffractive element 2 for a fixed position of the incident electromagnetic wave 9 and for a fixed position of the matrix-array sensor 4.

The displacement means 3 are arranged so that each relative position between the diffractive element 2 and the matrix-array sensor 4 differs from at least one of the other relative positions:
- according to a first pitch along the first axis of displacement 16, this first pitch preferably being constant for all the relative positions, and/or
- according to a second pitch along the second axis of displacement 17, this second pitch preferably being constant for all the relative positions.

These several relative positions are obtained by displacing the diffractive element 2 (by means of the stage 3).

In this embodiment, the two axes of displacement 16, 17 are orthogonal to one another.

In this embodiment, the two axes of displacement 16, 17 are orthogonal to the direction of propagation 29 along which the diffractive element 2 is arranged in order to receive the incident wave 9.

It should also be noted that this direction of propagation 29 and the third axis of displacement 18 are merged.

It should be noted that the device 1 does not comprise any other element having diffraction properties (grating, etc.) that is not fixed to the diffractive element 2. In other words, the device 1 does not comprise any other element having diffraction properties (grating, etc.) that is not moved when the diffractive element 2 is moved (under the action of the stage 3).

It should be noted that there is no optical mask and/or other diffractive element or diffraction grating between the diffractive element 2 and the sensor 4. It should also be noted that there is no optical element between the diffractive element and the sensor (such an optical element could be present, but would render the invention less compact).

A preferred embodiment of the method according to the invention for analysing an electromagnetic wave will now be described, implemented by the device 1.

Reception on Entry to the Device 1

This method comprises reception of the incident electromagnetic wave 9 by the diffractive element 2.

This wave is for example a quasi-collimated beam of white light exiting from a microscope.

The incident electromagnetic wave 9 is not focused on the diffractive element 2. The incident electromagnetic wave 9 is focused on any point of the diffractive element 2.

The wave 9 propagates in a direction of propagation 29 perpendicular to the plane of the diffractive element 2 and/or to the plane of the sensor 4.

The wave 9 propagates in a direction of propagation 29 perpendicular to the axes 11 and 12.

Diffraction on Entry to the Device 1, and Reception by the Sensor 4

The embodiment of the method according to the invention comprises conversion of this incident electromagnetic wave 9 into the diffracted electromagnetic wave 10 by the diffractive element 2.

The wave 10 propagates in a mean direction of propagation 30, each order propagating in its respective direction of propagation 31, 32, 33 or 34 (in the case of 4 orders).

The direction 30 is perpendicular to the plane of the diffractive element 2 and/or to the plane of the sensor 4.

The direction of propagation 30 is perpendicular to the axes 13 and 14.

The directions of propagation 29 and 30 are identical.

The diffractive element 2 generates or selects by itself only certain diffraction orders of the incident electromagnetic wave 9 (in particular without combining with another mask or grating or element having diffraction properties that is not fixed to the diffractive element 2).

The diffractive element 2 generates at least three diffraction orders, preferably:
- at least four diffraction orders (or exactly four diffraction orders, for example distributed about the optical axis 10, 30 with an angle of 90° separating each one of them, these orders propagating in the respective direction 31, 32, 33 and 34 thereof, as shown in FIG. 1, or
- at least five diffraction orders (or exactly five diffraction orders, comprising the four orders previously described and also the order zero that propagates along the optical axis 10, 30), corresponding respectively to at least (or exactly) nine or thirteen harmonics of the interference pattern received by the matrix-array sensor 4.

FIG. 8 illustrates the Fourier transform of an interference pattern (or interferogram) in the case of a diffracted wave 10, comprising four diffraction orders. FIG. 8 shows the nine harmonics corresponding to the nine square areas delimited by dashed lines.

Typically, the number of harmonics of the interference pattern received by the matrix-array sensor, and taken into account in calculating a value for intensity and/or phase gradient and/or phase, can comprise at least nine harmonics, or even at least thirteen harmonics, typically:
- the nine following harmonics: 0 (intersection of the axes 11 and 12 projected on the plane of the sensor 4); +/−1 along the axis 11 projected on the plane of the sensor 4; +/−1 along the axis 12 projected on the plane of the sensor 4; +/−1 along the two diagonals between the axes 11 and 12 projected on the plane of the sensor 4, or
- the thirteen following harmonics: 0 (intersection of the axes 11 and 12 projected on the plane of the sensor 4); +/−1 along the axis 11 projected on the plane of the sensor 4; +/−1 along the axis 12 projected on the plane of the sensor 4; +/−1 along the two diagonals between the axes 11 and 12 projected on the plane of the sensor 4; +/−0.5 along the two diagonals between the axes 11 and 12 projected on the plane of the sensor 4.

The embodiment of the method according to the invention comprises reception of an interference pattern of the diffracted electromagnetic wave 10 by the matrix-array sensor 4.

Displacement of the Diffractive Element 2

The embodiment of the method according to the invention comprises several acquisitions, by the matrix-array sensor 4, of a diffracted electromagnetic wave signal 10 corresponding to several relative positions between the diffractive element 2 and the matrix-array sensor 4. In other words each acquisition, by the matrix-array sensor 4, of a diffracted electromagnetic wave signal 10 corresponds to:
- a given relative position between the diffractive element 2 and the matrix-array sensor 4
- i.e. a given interferogram imaged on the sensor 4.

The several positions correspond to several relative positions between the diffractive element 2 and the matrix-array sensor 4 for a fixed position of the incident electromagnetic wave 9, more specifically to several positions of the diffractive element 2 for a fixed position of the incident electromagnetic wave 9 and for a fixed position of the matrix-array sensor 4.

The several positions correspond to several relative positions between the diffractive element 2 and the matrix-array sensor 4 along the two axes of displacement 16, 17.

The axes of displacement 16, 17 are orthogonal to one another.

At least one of the two axes of displacement 16, 17, and more specifically in the present embodiment, each of the two axes of displacement 16, 17, is orthogonal to the mean direction of propagation 29 of the incident electromagnetic wave 9 on the diffractive element 2.

The several positions correspond to at least three, preferably at least nine different positions.

Each relative position between the diffractive element 2 and the matrix-array sensor 4 differs from at least one of the other relative positions:
- according to a first pitch $dx_C$ along a first axis 16 of displacement, this pitch $dx_C$ preferably being constant for all the relative positions, and/or
- according to a second pitch $dy_C$ along a second axis 17 of displacement, this pitch $dy_C$ preferably being constant for all the relative positions.

Any form of scanning can be used: grid, S, spiral, etc.

The pitch $dx_C$ or $dy_C$ has a typical value comprised between 10 μm and 30 μm, with an accuracy of at least 0.04 μm (still in the case of an MHM).

Calculation and Processing

In order to obtain "high-definition" phase images, the images of the sensor 4 that are formed by the interferences of the different diffraction orders after propagation between the diffraction element 2 and the sensor 4 are taken as the basis. In this embodiment of the high-definition method according to the invention, the diffraction element 2 is displaced so as to phase-shift each of the harmonics composing the spectrum of the interferogram.

The embodiment of the method according to the invention comprises a calculation (by the processing means 6), from the several acquisitions corresponding to the several relative positions between the diffractive element 2 and the matrix-array sensor 4, of a value for intensity and/or phase gradient and/or phase of the incident electromagnetic wave 9 at each of the points of the matrix-array sensor 4.

This calculation comprises, for each of the points of interest of the incident electromagnetic wave 9, resolving a system of equations comprising as many equations as the number of the several relative positions between the diffractive element 2 and the matrix-array sensor 4.

The system of equations is resolved for example by use of a pseudo inverse matrix, in real space or in the Fourier space. The pseudo inverse matrix is calculated for example from the singular value decomposition linear algebra algorithm that makes it possible to decompose the matrix into singular values. When the singular values are too small, they are not taken into account for calculating the pseudo inverse matrix. The pseudo inverse matrix makes it possible to find the solution to a system of linear equations in the least squares sense.

All or part of the unknowns (hereinafter b, c, d, e, f, g, h, i, i.e. all except one, the unknown a) of the equation system) are expressed as a function of a phase gradient W of the incident electromagnetic wave 9 (gradient according to the x and/or y coordinate(s)).

Thus, generally in this embodiment of the method according to the invention:

- if at least N harmonics or exactly N harmonics are used (with N an integer, preferably greater than or equal to 2, preferably greater than or equal to 9),
- then the system of equations with N unknowns, including N−1, expressed as a function of a phase gradient of the incident electromagnetic wave 9 is resolved, and
- P different relative positions are used between the diffractive element 2 and the matrix-array sensor 4, in order to resolve the system of equations which then comprises P equations (with P an integer, preferably greater than or equal to 2, preferably greater than or equal to 9), with:
  - P>N in the case of oversampling, which makes it possible to increase the signal-to-noise ratio,
  - P=N in the simplest case,
  - P<N if redundancy of information or relationships between unknowns of the system of equations are used, which makes it possible to use less displacement and therefore to be quicker.

Example of Processing

An example of processing will now be described for:
P=9
N=9
P=N.

The diffractive element 2 comprises a combination of an intensity grating and a phase grating as described for the reference GR in patent application FR2795175 A1 and is arranged in order to select only 4 diffraction orders. The number of harmonics will therefore be nine: 0 (intersection of the axes 11 and 12 projected on the plane of the sensor 4); +/−1 along the axis 11 projected on the plane of the sensor 4; +/−1 along the axis 12 projected on the plane of the sensor 4 and +/−1 along the two diagonals between these two axes 11 and 12 projected on the plane of the sensor 4.

The diffractive element 2 considered in this example is the modified Hartmann mask (cf. FR2795175 A1) made from silica, with a period of 29.6 µm.

FIG. 2 shows nine positions of one and the same point 19 of the diffractive element 2 on the sensor 4, corresponding to P=9 different relative positions between the diffractive element 2 and the matrix-array sensor 4.

It should be noted that these positions are distributed uniformly with a constant pitch $dx_C$ and with a constant pitch $dy_C$.

The approach used here is based on calculations in the Fourier space. They make it possible to manage the sinusoidal aspect of the fringes and therefore to exploit the information contained in the pixels between the maxima, by means of a sinusoidal fit.

Referring now to the grating 2, the interferogram created on the sensor 4 and obtained for a shift dx along the coordinate x (along axis 11) and dy along the coordinate y (along the axis 12) of the grating 2 is written as follows and as shown in FIG. 3:

$$I_z(x, y; dx, dy) = I_0 + \frac{I_0}{2}e^{j\left(\frac{2\pi}{p}x - \frac{2\pi}{p}z\frac{\partial W}{\partial x}\right)}e^{j\frac{2\pi}{p}dx} + \frac{I_0}{2}e^{-j\left(\frac{2\pi}{p}x - \frac{2\pi}{p}z\frac{\partial W}{\partial x}\right)}e^{-j\frac{2\pi}{p}dx} +$$
$$\frac{I_0}{2}e^{j\left(\frac{2\pi}{p}y - \frac{2\pi}{p}z\frac{\partial W}{\partial y}\right)}e^{j\frac{2\pi}{p}dy} + \frac{I_0}{2}e^{-j\left(\frac{2\pi}{p}y - \frac{2\pi}{p}z\frac{\partial W}{\partial y}\right)}e^{-j\frac{2\pi}{p}dy} +$$
$$\frac{I_0}{2}e^{j\left(\frac{2\pi}{p}(x+y) - \frac{2\pi}{p}z\frac{\partial W}{\partial(x+y)}\right)}e^{j\frac{2\pi}{p}(dx+dy)} + \frac{I_0}{2}e^{-j\left(\frac{2\pi}{p}(x+y) - \frac{2\pi}{p}z\frac{\partial W}{\partial(x+y)}\right)}e^{-j\frac{2\pi}{p}(dx+dy)} +$$
$$\frac{I_0}{2}e^{j\left(\frac{2\pi}{p}(x-y) - \frac{2\pi}{p}z\frac{\partial W}{\partial(x-y)}\right)}e^{j\frac{2\pi}{p}(dx-dy)} + \frac{I_0}{2}e^{-j\left(\frac{2\pi}{p}(x-y) - \frac{2\pi}{p}z\frac{\partial W}{\partial(x-y)}\right)}e^{-j\frac{2\pi}{p}(dx-dy)}$$

with:

$I_0$ a constant corresponding to the intensity of the incident wave;

p the pitch (also called period) of the grating 2 (preferably identical along axes 11 and 12), typically p=29.6 µm;

z the distance (assumed to be uniform) between the plane of the element 2 and the plane of the sensor 4 (measured perpendicularly to the plane of the sensor 4 and to the plane of the element 2 and/or in the direction of propagation 30 of the diffracted wave 10 and/or along the axis of displacement 18). This distance z is typically less than 1 mm, in order to improve the sensitivity to the phase variations;

W the optical path difference (OPD) linked to the phase of the wave by $$\varphi = \frac{2\pi}{\lambda}W;$$

$$\frac{\partial W}{\partial x} \text{ and } \frac{\partial W}{\partial y},$$

partial derivatives of the OPD along x and y, also called "phase gradients" of the incident wave.

or also:

$$I_z(x, y; dx, dy) = a + b\,e^{j\frac{2\pi}{p}dx} + c\,e^{-j\frac{2\pi}{p}dx} + d\,e^{j\frac{2\pi}{p}dy} + e\,e^{-j\frac{2\pi}{p}dy} +$$
$$f\,e^{j\frac{2\pi}{p}(dx+dy)} + g\,e^{-j\frac{2\pi}{p}(dx+dy)} + h\,e^{j\frac{2\pi}{p}(dx-dy)} + i\,e^{-j\frac{2\pi}{p}(dx-dy)}$$

With a, b, c, d, e (without exponent), f, g, h, i the nine following unknowns of the system of equations to be resolved ("e" with an exponent representing the exponential function and j the complex number):

$$a = I_0$$

$$b = \frac{I_0}{2}e^{j\left(\frac{2\pi}{p}x - \frac{2\pi}{p}z\frac{\partial W}{\partial x}\right)}$$

$$c = \frac{I_0}{2}e^{-j\left(\frac{2\pi}{p}x - \frac{2\pi}{p}z\frac{\partial W}{\partial x}\right)}$$

$$d = \frac{I_0}{2}e^{j\left(\frac{2\pi}{p}y - \frac{2\pi}{p}z\frac{\partial W}{\partial y}\right)}$$

$$e = \frac{I_0}{2}e^{-j\left(\frac{2\pi}{p}y - \frac{2\pi}{p}z\frac{\partial W}{\partial y}\right)}$$

$$f = \frac{I_0}{2}e^{j\left(\frac{2\pi}{p}(x+y) - \frac{2\pi}{p}z\frac{\partial W}{\partial(x+y)}\right)}$$

$$g = \frac{I_0}{2}e^{-j\left(\frac{2\pi}{p}(x+y) - \frac{2\pi}{p}z\frac{\partial W}{\partial(x+y)}\right)}$$

$$h = \frac{I_0}{2}e^{j\left(\frac{2\pi}{p}(x-y) - \frac{2\pi}{p}z\frac{\partial W}{\partial(x-y)}\right)}$$

-continued $$i = \frac{I_0}{2} e^{-j\left(\frac{2\pi}{P}(x-y) - \frac{2\pi}{P} z \frac{\partial W}{\partial(x-y)}\right)}$$

Given that only the grating 2 is displaced in front of the CCD sensor 4 that remains fixed, the incident wave front 9 is unchanged and the data a, b, c, d, e, f, g, h, i are constants. These nine constants correspond to the nine harmonics of the Fourier transform.

There are therefore nine unknowns to be determined. To this end, nine interferograms must be used, or more or less according to the case.

In a matrix approach, the problem is written in the following way, as shown in FIG. 4:

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & e^{\frac{2i\pi}{P} \cdot dx1} & e^{-\frac{2i\pi}{P} \cdot dx1} & e^{\frac{2i\pi}{P} \cdot dy1} & e^{-\frac{2i\pi}{P} \cdot dy1} & e^{\frac{2i\pi}{P}(dx1+dy1)} & e^{-\frac{2i\pi}{P}(dx1+dy1)} & e^{\frac{2i\pi}{P}(dx1-dy1)} & e^{-\frac{2i\pi}{P}(dx1-dy1)} \\ 1 & e^{\frac{2i\pi}{P} \cdot dx2} & e^{-\frac{2i\pi}{P} \cdot dx2} & & & \cdots & & & \\ 1 & e^{\frac{2i\pi}{P} \cdot dx3} & & \cdots & & & & & \\ \cdots & & & & & & \cdots & & \\ 1 & e^{\frac{2i\pi}{P} \cdot dx10} & & & & & & & \\ \cdots & & & & & & & & \end{pmatrix}^{-1} \begin{pmatrix} I(x,y;dx1,dy1) \\ I(x,y;dx2,dy2) \\ I(x,y;dx3,dy3) \\ \cdots \\ I(x,y;dx10,dy10) \\ \cdots \end{pmatrix}$$

Resolving the system with a pseudo inverse matrix thus makes it possible to find the unknowns a, b, c, d, e, f, g, h, i.

According to the case:

P>N: the greater the number of interferograms used, the higher the signal-to-noise ratio.

P<N: by imposing certain conditions, such as for example redundancy of information between the peaks, it is possible to obtain the values of the coefficients with fewer than nine shifted interferograms: if investigating the unknowns a, b, c, d, e, f, g, h, i, it can be seen that there is redundancy of information. For example, the unknown "c" is the complex conjugate of the unknown "b". It is thus possible to find the values of these unknowns by using fewer than nine interferograms.

P=N in the simplest case.

Referring now to the simplest case with P=N, nine shifted interferograms are used in order to resolve the system. These nine unknowns are then found by carrying out an acquisition of nine interferograms.

In a matrix approach, the problem is written in the following way, as shown in FIG. 5:

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & e^{\frac{2i\pi}{P} \cdot dx1} & e^{-\frac{2i\pi}{P} \cdot dx1} & e^{\frac{2i\pi}{P} \cdot dy1} & e^{-\frac{2i\pi}{P} \cdot dy1} & e^{\frac{2i\pi}{P}(dx1+dy1)} & e^{-\frac{2i\pi}{P}(dx1+dy1)} & e^{\frac{2i\pi}{P}(dx1-dy1)} & e^{-\frac{2i\pi}{P}(dx1-dy1)} \\ 1 & e^{\frac{2i\pi}{P} \cdot dx2} & e^{-\frac{2i\pi}{P} \cdot dx2} & & & \cdots & & & \\ 1 & e^{\frac{2i\pi}{P} \cdot dx3} & & \cdots & & & & & \\ \cdots & & & & & & \cdots & & \\ 1 & e^{\frac{2i\pi}{P} \cdot dx9} & & & & & & & \end{pmatrix}^{-1} \begin{pmatrix} I(x,y;dx1,dy1) \\ I(x,y;dx2,dy2) \\ I(x,y;dx3,dy3) \\ \cdots \\ I(x,y;dx9,dy9) \end{pmatrix}$$

Having determined the unknowns a, b, c, d, e, f, g, h, i, it is then possible to find, with a "high definition":
- the intensity value I (coefficient a), and/or
- the phase gradients in the direction x (coefficient b/c) in the direction y (coefficient d/e) and/or
- the phase, by a numerical integration of the gradients.

It should be noted that it is also possible to carry out this calculation in real space by using the oscillating terms cosine and sine. This makes it possible to improve the speed of calculation. Thus the following equations are used, as shown in FIG. 6:

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & \cos\left(\frac{2\pi}{p}dx_1\right) & \sin\left(\frac{2\pi}{p}dx_1\right) & \cos\left(\frac{2\pi}{p}dy_1\right) & \sin\left(\frac{2\pi}{p}dy_1\right) & \cos\left(\frac{2\pi}{p}(dx_1+dy_1)\right) & \cdots \\ 1 & \cos\left(\frac{2\pi}{p}dx_2\right) & \sin\left(\frac{2\pi}{p}dx_2\right) & & & & \cdots \\ 1 & \cos\left(\frac{2\pi}{p}dx_3\right) & & & & & \cdots \\ \cdots & & & & & & \\ & \sin\left(\frac{2\pi}{p}(dx_1+dy_1)\right) & \cos\left(\frac{2\pi}{p}(dx_1-dy_1)\right) & \sin\left(\frac{2\pi}{p}(dx_1-dy_1)\right) & & & \\ & & & \cdots & & & \end{pmatrix}^{-1} \cdot \begin{pmatrix} I(x,y;dx_1,dy_1) \\ I(x,y;dx_2,dy_2) \\ I(x,y;dx_3,dy_3) \\ \cdots \end{pmatrix}$$

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = M^{-1} \begin{pmatrix} I(x,y;dx1,dy1) \\ I(x,y;dx2,dy2) \\ I(x,y;dx3,dy3) \\ \cdots \\ I(x,y;dx10,dy10) \\ \cdots \end{pmatrix}$$

with:

$a(x,y) = I_0(x,y);$ $b(x,y) = \frac{I_0(x,y)}{2}\cos\left(\frac{2\pi}{p}\left(z\frac{\partial W}{\partial x} - x\right)\right);$ $c(x,y) = \frac{I_0(x,y)}{2}\sin\left(\frac{2\pi}{p}\left(z\frac{\partial W}{\partial x} - x\right)\right);$ $d(x,y) = \frac{I_0(x,y)}{2}\cos\left(\frac{2\pi}{p}\left(z\frac{\partial W}{\partial y} - y\right)\right);$ $e(x,y) = \frac{I_0(x,y)}{2}\sin\left(\frac{2\pi}{p}\left(z\frac{\partial W}{\partial x} - x\right)\right);$ $f(x,y) = \frac{I_0(x,y)}{2}\cos\left(\frac{2\pi}{p}\left(z\frac{\partial W}{\partial(x+y)} - (x+y)\right)\right);$ $g(x,y) = \frac{I_0(x,y)}{2}\sin\left(\frac{2\pi}{p}\left(z\frac{\partial W}{\partial(x+y)} - (x+y)\right)\right);$ $h(x,y) = \frac{I_0(x,y)}{2}\cos\left(\frac{2\pi}{p}\left(z\frac{\partial W}{\partial(x-y)} - (x-y)\right)\right);$ $i(x,y) = \frac{I_0(x,y)}{2}\sin\left(\frac{2\pi}{p}\left(z\frac{\partial W}{\partial(x-y)} - (x-y)\right)\right)$ By performing the inverse tangents of the ratios b/c and d/e, the phase gradients can be reached.

Improvement in the Resolution According to the Invention with Respect to the State of the Art By "measurement resolution" is meant the smallest dimension of measurement of phase or intensity or of phase gradients resolved by the sensor.

By "sensor resolution" is meant the smallest dimension detected by the sensor. This is typically the pixel size of this sensor.

By "definition" is meant the ratio between the "sensor resolution" used for the measurement and the "measurement resolution".

The situation that has just been described (four diffraction orders, nine harmonics) will now be compared in the case of the state of the art and in the case of the invention.

Within the context of the approximation to four diffraction orders (interference at 4 waves borne by 4 wave vectors $k_1$, $k_2$, $k_3$ and $k_4$), the intensity recorded by the sensor can be written:

$$I(r) = \sum_{m,n=1}^{m,n=4} A_m A_n^* \exp\{-j(k_m - k_n) \cdot r\}$$

The information sought in order to recover the amplitude of the electromagnetic field is contained in the terms $A_m A_n^*$. At each point r of the detector, there is therefore a measurement I(r) and sixteen unknowns $A_m A_n^*$ (m, n are integers varying from 1 to 4). If a Fourier transform is carried out on the signal I(r), due to the symmetries, the information is in fact grouped around nine harmonics corresponding to the coefficients a, b, c, etc.

In the case of the state of the art, for example in the article "Quadriwave lateral shearing interferometry for quantitative phase microscopy of living cells" published in the journal Optics Express in 2009 (Vol. 17, No. 15), it is necessary to form hypotheses in order to recover the desired information and resolve this equation. Thus if it is assumed that the frequency supports of these harmonics are different, it is possible to resolve the problem below by windowing the different harmonics. This assumption thus implies that the resolution of the images obtained is lower than that of the CCD sensor, as the frequency support of the harmonics is limited. In the case of the commercial product SID4, the loss of resolution has the value 4.

The "definition" is therefore ¼.

In the case of the invention, the windowing around the harmonics is no longer carried out. In fact, the displacement of the periodic pattern 2 between each acquisition will make it possible to obtain the totality of the information contained by each harmonic. The term:

$$\exp\{-j(k_m-k_n)\cdot r\}$$

will in fact be modulated so that the different pairs (m, n) can be separated. By resolving the linear equation with several unknowns as described above, the sought terms $A_m A_n^*$ are thus found. With the ability to extract the totality of the information for all the frequencies sampled by the sensor, it is therefore possible to reconstruct a phase image, intensity, and or phase gradient having the same resolution as the sensor 4.

The measurement resolution is improved, and the "definition" is therefore 1.

Variant According to the Invention of the Periodic Pattern 2

Everything described in the present description remains valid, replacing the grating 2 or the diffractive element 2 or the periodic pattern 2 by a diffractive element 2 or a periodic pattern 2 that is displayed or borne by an optical component that is fixed to, or borne by, an optical component that is fixed with respect to the matrix-array sensor 4, said optical component being arranged in order to displace the diffractive element 2 or the periodic pattern 2 with respect to the matrix-array sensor 4.

This optical component is preferably a spatial light modulator such as a liquid crystal modulator, which displays the diffraction element 2 or the periodic pattern 2 and displaces the diffraction element 2 or the periodic pattern 2 by modifying its display.

This solution has the advantage of:
being potentially less expensive, and/or
making it possible to take intensity measurements directly for fluorescence without loss of light due to the absorption of a diffraction grating, but is potentially less general, since it can be assumed that the incident wave is linearly polarized.

Optimization of the Angle 15 and the Pitches Dx and Dy According to the Invention Each of the embodiments of the method or variants according to the invention also comprises:
a calculation (by the processing means 6) of an optimum value of the pitch dx (or $dx_C$) and/or an optimum value of the pitch dy (or $dy_C$), and/or
a calculation (by the processing means 6) of an optimum value of the angle of inclination 15, optionally followed by a step of adjusting this angle 15 (via the support 20).

Calculating an optimum value of the pitch dx (or $dx_C$) and/or an optimum value of the pitch dy (or $dy_C$) can comprise maximization of the determinant or of the condition number of a matrix corresponding to a system of equations comprising as many equations as the number of the several relative positions between the periodic pattern and the matrix-array sensor.

Calculating an optimum value of the angle of inclination comprises maximization of the determinant or of the condition number of a matrix corresponding to a system of equations comprising as many equations as the number of the several relative positions between the periodic pattern and the matrix-array sensor.

If P=N, the equation system corresponds to a square matrix, and the determinant thereof will be the basis.

If P*N, the equation system corresponds to a matrix that is not square, and the condition number thereof will be the basis. If A is a matrix, the condition number K(A) thereof is the ratio between the greatest characteristic value thereof and the smallest characteristic value thereof.

Reconsidering the preceding example with nine unknowns a, b, c, d, e, f, g, h, and i, it has been shown that in order to calculate a "high definition" phase image a system having nine unknowns (corresponding to the nine harmonics of the interferogram) is resolved. In order to resolve this system, the grid of the diffraction grating 2 is displaced at least nine times in order to phase-shift each of the harmonics. These nine acquired interferograms thus make it possible to resolve the system.

In order to resolve it, a matrix is inverted. The elements of this matrix are indicated by the following formula, as shown in FIG. 7:

$$\begin{pmatrix} a(x,y) \\ b(x,y) \\ c(x,y) \\ d(x,y) \\ e(x,y) \\ f(x,y) \\ g(x,y) \\ h(x,y) \\ i(x,y) \end{pmatrix} = \begin{pmatrix} 1 & \cos\left(\frac{2\pi}{p}dx_1\right) & \sin\left(\frac{2\pi}{p}dx_1\right) & \cos\left(\frac{2\pi}{p}dy_1\right) & \sin\left(\frac{2\pi}{p}dy_1\right) & \cos\left(\frac{2\pi}{p}(dx_1+dy_1)\right) \\ 1 & \cos\left(\frac{2\pi}{p}dx_2\right) & \sin\left(\frac{2\pi}{p}dx_2\right) & & & \cdots \\ 1 & \cos\left(\frac{2\pi}{p}dx_3\right) & \cdots & & & \\ \cdots & & & & & \end{pmatrix}$$

-continued $$\left. \sin\left(\frac{2\pi}{p}(dx_1+dy_1)\right) \quad \cos\left(\frac{2\pi}{p}(dx_1-dy_1)\right) \quad \sin\left(\frac{2\pi}{p}(dx_1-dy_1)\right) \right]^{-1} \cdot \begin{pmatrix} I(x, y; dx1, dy1) \\ I(x, y; dx2, dy2) \\ I(x, y; dx3, dy3) \\ \ldots \end{pmatrix}$$

with:
1) $dx_i$ and $dy_i$ (i an integer comprised between 1 and P), with the displacements carried out for the interferogram number i. These displacements are the displacements carried out within the reference frame of the grating 2 along the axes 11 and 12. They are therefore written:

$$dx_i = dx_c \cos(\theta) + dy_c \sin(\theta) \text{ and}$$

$$dy_i = -dy_c \sin(\theta) + dy_c \cos(\theta)$$

2) $dx_c$ and $dy_{qC}$ the real displacements within the reference frame of the camera 4 along axes 13 and 14 (which is the same reference frame as for the stage 3) and $\theta$ the angle of inclination 15 of the grating 2.
3) p the period of the grating 2.

It should be noted that in order to resolve the system, the matrix must be inverted. In order to introduce the smallest amount of error possible during the resolution of the nine unknowns a, b, c, d, e, f, g, h, i it is therefore necessary to maximize the determinant (or the condition number) of this matrix.

The determinant or the condition number of the matrix depends both on the displacements $dx_c$ and $dy_c$ of the stage 3 but also on the angle of inclination 15 of the grating 2.

Thus in order to generate the smallest amount of error possible on calculating the coefficients a, b, c, d, e, f, g, h, i it will be sought to maximize the determinant or the condition number of the matrix.

Thus, the optimum value of the angle of inclination 15 and/or the optimum value of the first pitch and/or the optimum value of the second pitch is arranged in order to minimize the errors of calculation of the unknowns (coefficients a, b, c, d, e, f, g, h, i) of this system of equations.

Therefore the determinant or the condition number is calculated for different triplets ($dx_c$, $dy_c$, $\theta$). The triplets for which the value of the determinant or the condition number is high make it possible to determine the optimum points for producing "high-definition" phase images.

This calculation of the optimum value of pitch and/or angle 15 can be carried out by the device 1 before a measurement on the wave 9, or can be implemented during the construction or design or a calibration of the device 1.

Advantageously, this calculation of an optimum value of the pitch $dx_C$, $dy_c$ and/or of angle 15:
can be carried out by the device 1:
before a measurement on the wave 9 and/or
after a modification of the periodic pattern 2 (by manual replacement of the diffractive element 2 or by modification of the display of the periodic pattern 2 on the optical component or spatial light modulator), for example a modification of the pitch P thereof, and/or
after a modification of the number of displacements carried out, for example in order to reduce the measurement noise,
in the case of a calculation of the angle 15, be followed by an adjustment of this angle 15 to the optimum calculated value thereof, by the adjustment means 20, before a measurement on the wave 9 (i.e. before the conversion of the incident electromagnetic wave 9 into the diffracted electromagnetic wave 10 and the reception, by the matrix-array sensor 4, of an interference pattern of the diffracted electromagnetic wave 10 used for the calculation according to the invention).

Of course, the invention is not limited to the examples which have just been described and numerous adjustments can be made to these examples without exceeding the scope of the invention. Thus, in variants of each of the embodiments previously described:
instead of displacing the periodic pattern 2, the sensor 4 is displaced. Thus, the several relative positions correspond to several positions of the matrix-array sensor 4 for a fixed position of the incident electromagnetic wave 9 and for a fixed position of the periodic pattern 2. However, this variant is less advantageous, as it requires resetting the interferograms so that each of the pixels (x, y) of each interferogram corresponds to the same points of the incident beam; and/or
the several relative positions correspond to several relative positions between the periodic pattern 2 and the matrix-array sensor 4 along a single axis of displacement 16 (this single axis of displacement 16 is then preferably orthogonal to the direction of propagation 29 of the incident electromagnetic wave 9 on the periodic pattern 2). This can be the case:
when "high resolution" is only required along an axis 13. In this case, two diffraction orders are sufficient. Three relative positions between the periodic pattern 2 and the sensor 4 are sufficient, corresponding for example to the three harmonics 0 and +/−1 along the axis 11 projected on the plane of the sensor 4. In this case, it is sufficient that the periodic pattern 2 only comprises diffraction properties along an axis of periodicity 11, or
when "high resolution" is required along two axes 13, 14 but limiting the displacement of the periodic pattern 2 or of the sensor 4 to along an axis of displacement 16, and/or
the periodic pattern 2 has a spatial periodicity along more than two axes of periodicity (and thus generates more than five diffraction orders). This is for example the case of a diffractive element 2 comprising a grating with a hexagonal periodic pattern; and/or
the pitches dx or $dx_C$, and/or dy or $dy_C$ are not necessarily constant between the different relative positions; and/or
there are optical elements between the periodic pattern 2 and the sensor 4, in particular lenses for adapting the size of the wave 10 to the sensor 4 and/or the mirrors for routing the wave 10 to the sensor 4. However, this variant is less advantageous because it increases the volume and the space requirement of the device 1; and/or the calculation method does not necessarily use a matrix. Any method making it possible to resolve the system of P equations is compatible with the invention; and/or the calculation method is not necessarily within the real or Fourier space. It is possible in fact to use any function that has an inverse function making it possible to return to the starting space, given that the calculations are based on linear combinations; and/or all of the preceding description can be generalized by replacing the periodic pattern 2 or the grating 2 by a diffractive element 2 and vice-versa; and/or all of the preceding description can be generalized with a diffractive element 2 that generates the diffracted wave 10 by reflection and/or transmission of the incident wave 9.

Of course, the various characteristics, forms, variants and embodiments of the invention can be combined together in various combinations inasmuch as they are not incompatible or mutually exclusive. In particular, all the variants and the embodiments described above can be combined together.

The invention claimed is:

1. Method for analyzing an electromagnetic wave, comprising:
receiving an incident electromagnetic wave by a diffractive element, and converting the incident electromagnetic wave into a diffracted electromagnetic wave by the diffractive element, the diffracted electromagnetic wave comprising at least three diffraction orders,
receiving, by a matrix-array sensor, a two-dimensional interference pattern formed by interference of the at least three diffraction orders of the diffracted electromagnetic wave after propagation between the diffractive element and the matrix-array sensor, the matrix-array sensor having a matrix array of pixels aligned along two axes of alignment of pixels, the matrix-array sensor producing an interferogram in response to said receiving of the diffracted electromagnetic wave,
performing several acquisitions, by the matrix-array sensor, each acquisition producing a respective interferogram in response to a respective received diffracted electromagnetic wave, the several acquisitions corresponding, respectively, to several relative positions between the diffractive element and the matrix-array sensor,
calculating, based on interferograms produced from the several acquisitions corresponding, respectively, to the several relative positions between the diffractive element and the matrix-array sensor, a value for phase gradient and/or phase at each point of the matrix-array sensor used to produce a phase image of the incident electromagnetic wave.

2. Method according to claim 1, characterized in that there is no optical mask and/or any other diffractive element between the diffractive element and the sensor.

3. Method according to claim 1, characterized in that there is no optical element between the diffractive element and the sensor.

4. Method according to claim 1, characterized in that the diffractive element generates at least four diffraction orders of the incident electromagnetic wave up to the sensor.

5. Method according to claim 1, characterized in that the diffractive element is a periodic pattern having a spatial periodicity along at least two axes of periodicity.

6. Method according to claim 5, characterized in that there is an angle of inclination between:
the axes of periodicity, and
the projection, on the plane of the diffractive element of the axes of alignment of pixels and/or of the axes of displacement of the relative positions between the diffractive element and the matrix-array sensor.

7. Method according to claim 6, characterized in that it comprises calculating an optimum value for the angle of inclination:
the step of calculating a value for phase gradient and/or phase comprising resolving a system of equations comprising as many equations as the number of the several relative positions between the diffractive element and the matrix-array sensor,
the optimum value of the angle of inclination being arranged in order to minimize the errors of calculation of the unknowns of said system of equations,
the method comprising an adjustment of this angle of inclination to the calculated optimum value thereof.

8. Method according to claim 7, characterized in that the step of calculating an optimum value of the angle of inclination comprises maximization of the determinant or of the condition number of a matrix corresponding to this system of equations comprising as many equations as the number of the several relative positions between the diffractive element and the matrix-array sensor.

9. Method according to claim 1, characterized in that the several positions correspond to several relative positions between the diffractive element and the matrix-array sensor along two axes of displacement orthogonal to one another.

10. Method according to claim 9, characterized in that each of the two axes of displacement is orthogonal to a direction of propagation of the incident electromagnetic wave on the diffractive element.

11. Method according to claim 1, characterized in that each relative position between the diffractive element and the matrix-array sensor differs from at least one of the other relative positions:
according to a first pitch along a first axis of displacement, this first pitch preferably being constant for all the relative positions, and/or
according to a second pitch along a second axis of displacement, this second pitch preferably being constant for all the relative positions.

12. Method according to claim 11, characterized in that it comprises a calculation of an optimum value of the first pitch and/or an optimum value of the second pitch:
the step of calculating a value for phase gradient and/or phase comprising resolving a system of equations comprising as many equations as the number of the several relative positions between the diffractive element and the matrix-array sensor,
the optimum value of the first pitch and/or the optimum value of the second pitch being arranged in order to minimize the errors of calculation of the unknowns of said system of equations.

13. Method according to claim 12, characterized in that calculating an optimum value of the first pitch and/or an optimum value of the second pitch comprises maximization of the determinant or of the condition number of a matrix corresponding to this system of equations comprising as many equations as the number of the several relative positions between the diffractive element and the matrix-array sensor.

14. Method according to claim 1, characterized in that the several positions correspond to at least nine different positions.

15. Method according to claim 1, characterized in that the diffractive element is a diffractive element that is mobile with respect to the matrix-array sensor.

16. Method according to claim 1, characterized in that the diffractive element is borne by an optical component that is fixed with respect to the matrix-array sensor, said optical component being arranged in order to displace the diffractive element with respect to the matrix-array sensor, said optical component preferably being a spatial light modulator.

17. Method according to claim 1, characterized in that calculating a value for phase gradient and/or phase comprises resolving a system of equations comprising as many equations as the number of the several relative positions between the diffractive element and the matrix-array sensor.

18. Method according to claim 17, characterized in that the system of equations is resolved by use of a pseudo inverse matrix.

19. Method according to claim 17, characterized in that all or part of the unknowns of the equation system are expressed as a function of a phase gradient of the incident electromagnetic wave.

20. Device for analyzing an electromagnetic wave, comprising:
- a diffractive element arranged to receive an incident electromagnetic wave and to convert the incident electromagnetic wave into a diffracted electromagnetic wave, the diffracted electromagnetic wave comprising at least three diffraction orders,
- a matrix-array sensor having a matrix array of pixels aligned along two axes of alignment of pixels, said sensor being arranged to receive a two-dimensional interference pattern formed by interference of the at least three diffraction orders of the diffracted electromagnetic wave after propagation between the diffractive element and the matrix-array sensor, the matrix-array sensor producing an interferogram in response to receiving the diffracted electromagnetic wave,
- the device comprising displacement means arranged to modify a relative position between the diffractive element and the matrix-array sensor,
- said device being arranged to perform several acquisitions, by the matrix-array sensor, each acquisition producing a respective interferogram in response to a respective received diffracted electromagnetic wave, the several acquisitions corresponding, respectively, to several relative positions between the diffractive element and the matrix-array sensor,
- the device comprising processing means arranged and/or programmed to calculate, based on interferograms produced from the several acquisitions corresponding, respectively, to the several relative positions between the diffractive element and the matrix-array sensor, a value for phase gradient and/or phase at each point of the matrix-array sensor used to produce a phase image of the incident electromagnetic wave.

* * * * *

UNITED STATES PATENT AND TRADEMARK OFFICE
CERTIFICATE OF CORRECTION

PATENT NO.      : 11,029,214 B2
APPLICATION NO. : 16/334906
DATED           : June 8, 2021
INVENTOR(S)     : Wattellier et al.

Page 1 of 1

It is certified that error appears in the above-identified patent and that said Letters Patent is hereby corrected as shown below:

In the Specification

In Column 20, Line 35, delete "P*N," and insert -- P≠N, --, therefor.

Signed and Sealed this
First Day of March, 2022

Drew Hirshfeld
*Performing the Functions and Duties of the
Under Secretary of Commerce for Intellectual Property and
Director of the United States Patent and Trademark Office*